United States Patent
Karaoguz et al.

(10) Patent No.: US 8,035,745 B2
(45) Date of Patent: Oct. 11, 2011

(54) TELEVISION CHANNEL SELECTION CANVAS

(75) Inventors: Jeyhan Karaoguz, Irvine, CA (US); James Bennett, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/644,218

(22) Filed: Dec. 22, 2009

(65) Prior Publication Data

US 2010/0151904 A1    Jun. 17, 2010

Related U.S. Application Data

(63) Continuation of application No. 10/826,345, filed on Apr. 19, 2004, now Pat. No. 7,639,308.

(51) Int. Cl.
*H04N 5/45* (2011.01)
*H04N 5/445* (2011.01)

(52) U.S. Cl. .......... 348/564; 348/565; 348/588; 725/43; 725/38; 715/838; 715/719

(58) Field of Classification Search ................. 348/564, 348/565, 14.07, 588, 732; 725/38, 43, 39; 715/838, 715

See application file for complete search history.

(56) References Cited

U.S. PATENT DOCUMENTS

| | | | |
|---|---|---|---|
| 5,623,589 A | 4/1997 | Needham et al. | |
| 5,900,868 A | 5/1999 | Duhault et al. | |
| 6,008,809 A | 12/1999 | Brooks | |
| 6,091,771 A | 7/2000 | Seeley et al. | |
| 6,456,305 B1 | 9/2002 | Qureshi et al. | |
| 6,456,334 B1 | 9/2002 | Duhault | |
| 6,481,012 B1 | 11/2002 | Gordon et al. | |
| 6,799,327 B1 | 9/2004 | Reynolds et al. | |
| 6,857,128 B1 | 2/2005 | Borden et al. | |
| 6,964,025 B2 | 11/2005 | Angiulo et al. | |
| 6,978,473 B1 | 12/2005 | Nsonwu et al. | |
| 6,990,676 B1 | 1/2006 | Proehl et al. | |
| 7,039,935 B2 | 5/2006 | Knudson et al. | |
| 7,080,392 B1 | 7/2006 | Geshwind | |
| 7,084,926 B2 | 8/2006 | Yamanishi | |
| 7,152,210 B1 | 12/2006 | Van Den Hoven et al. | |
| 7,174,512 B2 | 2/2007 | Martin et al. | |
| 7,194,701 B2 | 3/2007 | Stavely et al. | |
| 7,196,722 B2 | 3/2007 | White et al. | |
| 7,251,790 B1 | 7/2007 | Drucker et al. | |
| 7,269,800 B2 | 9/2007 | Manolis et al. | |
| 7,281,220 B1 | 10/2007 | Rashkovskiy | |
| 2005/0028220 A1 | 2/2005 | Baer et al. | |
| 2005/0102634 A1 | 5/2005 | Sloo | |

*Primary Examiner* — Michael Lee
*Assistant Examiner* — Jean W Desir
(74) *Attorney, Agent, or Firm* — Sterne, Kessler, Goldstein & Fox P.L.L.C.

(57) ABSTRACT

A channel selection canvas for display on a video display device is disclosed. The video display device can be a television, a laptop computer, or personal digital assistant device. The channel selection canvas allows a user to preview and choose video signals to be watched. The channel selection canvas displays a set of television channel video thumbnails, which can be full motion video, slow motion video or sampled video snapshots. A channel selection canvas can also display video thumbnails for security cameras, baby monitors, video phones and the like. A channel selection canvas generator that generates channel selection canvases is also disclosed. The channel selection canvas generator can reside within a television, set top box or similar video processing device.

21 Claims, 6 Drawing Sheets

TELEVISION CHANNEL SELECTION CANVAS

CROSS-REFERENCE TO RELATED APPLICATION

The application is a continuation of U.S. patent application Ser. No. 10/826,345, filed Apr. 19, 2004 (now allowed), which is incorporated herein by reference in its entirety.

BACKGROUND OF THE INVENTION

1. Field of Invention

The present invention relates to television technology, and more particularly to providing a television channel selection canvas.

2. Background Art

Sources of video signals available within a typical household have proliferated, and are likely to continue to do so. Hundreds of television channels are typically available through digital cable or satellite television service. Moreover in a residence, a consumer may also have a personal video recorder (PVR), a security monitoring system, a video baby monitor, and/or a security monitoring system that produce additional video signals.

Existing television channel guides and remote controls provide a relatively crude mechanism for previewing and choosing which television video signal to view, and do not support video signals from other sources, such as a security camera. For example, existing cable TV selection guides provide a listing of channels that can be viewed. These guides typically provide a scrolling list of channels that identify the channel number and programming information (e.g., name of show, time, rating, etc.). In order to view what is playing on a particular channel, a user will usually have to wait for the guide to scroll through the entire list of channels. Even with basic cable services, where only 50-100 channels are available, waiting for a channel of interest to appear can be tedious and frustrating. While digital cable and satellite TV services allow a user to jump to a particular channel in a selection guide, these guides remain limited in that they typically show only the channel and title of the show. Upon selection of a particular channel, a summary description can be provided, or the video signal associated with the channel can be displayed.

Some higher end television sets can display a picture in a picture (PIP) as a way of previewing a channel. PIP systems are limited, however, in that they typically show only one alternative channel and can not be configured to a particular user. Furthermore PIP displays on a television typically provide limited previewing and selection capabilities. As a result, consumers have not widely embraced PIP.

Historically, selection guides and channel previewing mechanisms have been limited by the processing power and analog nature of television sets and cable set top boxes. Increasingly television signals are being transmitted digitally, and televisions and set top boxes have increasing processing power and ability to manipulate signals. Other technology advances have stimulated the deployment of other sources of video signals, such as security cameras and video phones. Finally, alternatives to distributing video signals throughout a residence are beginning to emerge. These alternatives can be used to form an integrated in-house network for all video sources. While these technologies are developing, previewing, integration and selection capabilities for video signals have lagged behind, and remain relatively primitive. Current video previewing and selection mechanisms do not take full advantage of the migration to digital technologies and the added processing power in televisions and set top boxes.

What is needed is a system that provides a user interface mechanism for allowing a user to conveniently preview video signals and select a video to be viewed.

BRIEF DESCRIPTION OF THE FIGURES

The invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

In particular, for ease of illustration, invention embodiments are primarily discussed in the context of a residential setting. The invention is not limited to use in a residential setting. The invention could be used in any setting where multiple video signals are present, such as an office or other business location. Furthermore, the invention embodiments focus on displaying the channel selection canvas on a television. The invention is not limited to use on a television. The channel selection canvas could be displayed on any display devices capable of displaying multiple video streams or snapshots. Such devices could include, but are not limited to a display monitor, laptop computer, personal computer, personal digital assistant (PDA), cell phone, or a smart phone.

Figure 1:
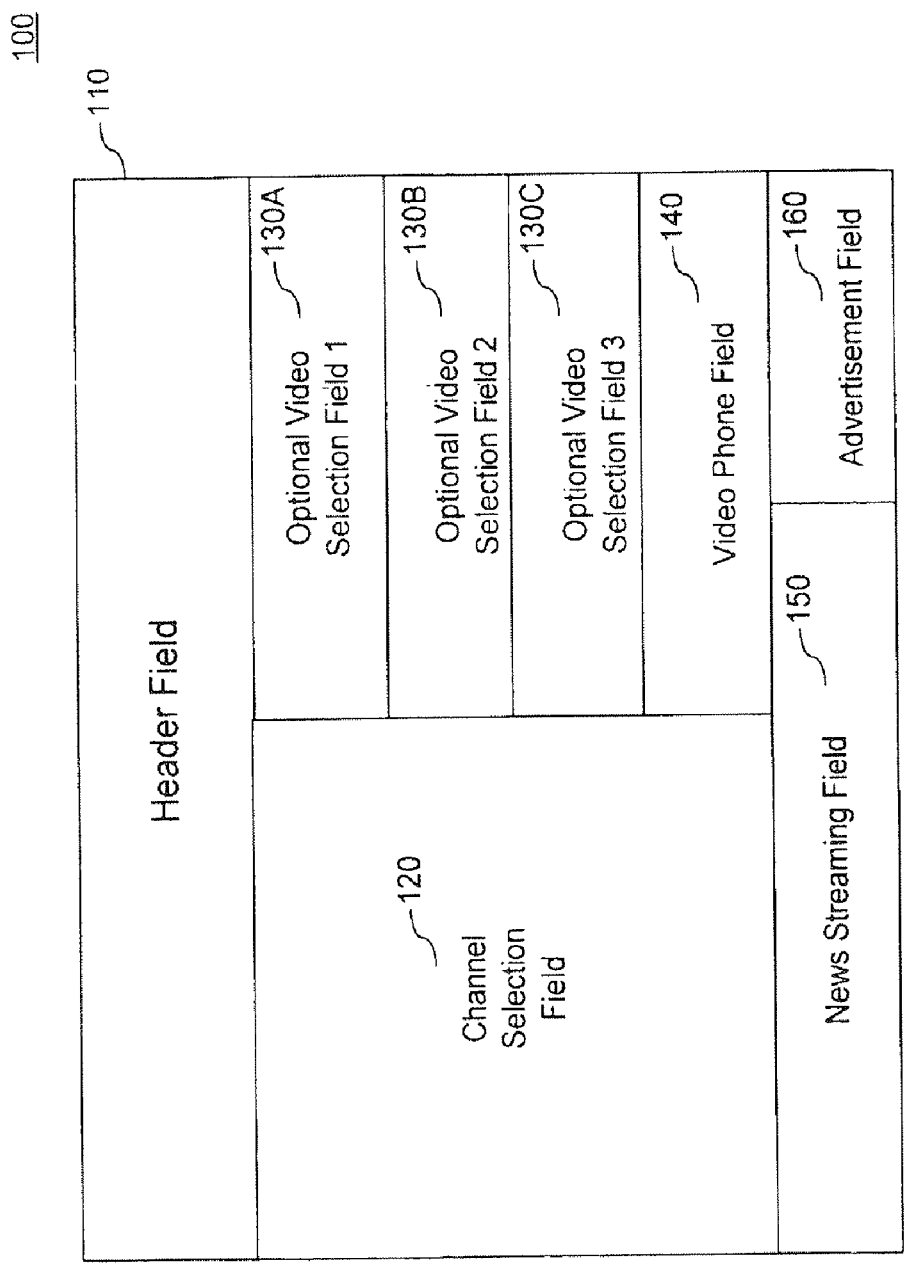
FIG. 1 is a diagram of a channel selection canvas, according to an embodiment of the invention.

FIG. 1 is a diagram of channel selection canvas 100, according to an embodiment of the invention. Channel selection canvas 100 can be displayed on a video display device for allowing users to preview and select video signals to watch. The video display device could be any type of display device capable of displaying multiple video thumbnails, such as a cathode ray tube (CRT), liquid crystal display (LCD), plasma flat panel display (FPD), and the like. Video thumbnails can include full motion video, slow motion video, and snapshots of a sampled video stream. The display devices could include, but are not limited to, televisions, monitors, personal computers, laptop computers, personal computers, PDAs, cell phones, smart phones, video phones and the like.

Channel selection canvas 100 includes header field 110; channel selection field 120; a set of optional video selection fields 130A, 130B and 130C; video phone field 140; news streaming field 150 and advertisement field 160.

The fields are oriented within channel selection canvas 100, such that header field 110 appears across the top of channel selection canvas 100. Channel selection field 120 is located on the left half of channel selection canvas 100 beneath header field 110, while the optional selection video fields 130 and video phone field 140 are located on the right half of channel selection canvas 100. News streaming field 150 and advertisement field 160 are located across the bottom of channel selection canvas 100.

Alternative embodiments of channel selection canvas 100 can include any combination of these fields, including but not limited to containing only channel selection field 120. In other alternative embodiments the orientation of the fields can be different. In one embodiment the specific orientation of the fields can be dynamically determined by a user. In this case, the user can include those fields that are of most interest to him and adjust the location, size, color, theme, background, and orientation of the fields to meet his personal preferences.

Header field 110 displays general information. General information can identify the user of the canvas. The general information can also include the date, day of week, time, weather information, and the like.

Channel selection field 120 displays a set of television channel video thumbnails for previewing and selecting programming channels (e.g., broadcast television, cable television, satellite television channels) to watch. A video thumbnail can be full motion video, slow motion video, snapshots of the video signals that refresh periodically, or snapshots that do not refresh. The number of television channels displayed will be a function of the capabilities of the video receiving device (e.g., television or set top box), the capabilities of the display device and video quality desired.

Historically, when analog signals were used exclusively a tuner was required for every channel to be viewed. Currently, with digital technology a tuner is not needed for every channel, thus as more digital television sets and digital services become available displaying multiple thumbnails can occur without the expense of multiple tuners.

In one embodiment, a video thumbnail, the name of the show, the time for the show, the network and picture quality (e.g., standard definition or high definition) can be displayed for each channel being previewed. A user can select to view one of the channels within channel selection field 120. Selection mechanisms can include scrolling over the selection of interest, use of an RF or infra-red remote, or other mechanism that will be known to individuals skilled in the relevant arts. These selection mechanisms apply to all fields within channel selection canvas 100.

Optional video selection fields 130 can be used for displaying ancillary video thumbnails. Optional video selection fields can include security monitor video thumbnails, baby monitor thumbnails, personal video recorder (PVR) thumbnails or any other type of video signals. When used with a PVR, the optional video selection field can be used to step through the recording segments on a PVR to find a particular recording of interest.

Video phone field 140 can be used for displaying a video phone thumbnail that shows a party being communicated with over a video phone. The video phone field can also be programmed to allow a user to answer or place a call through the channel selection canvas.

News streaming field 150 can be used to display streaming news information. In one embodiment the streaming news information can include news headlines such as those streaming along the bottom of a CNN broadcast. In another embodiment, the streaming news information can include stock ticker symbols such as those streaming along the bottom of a CNBC broadcast.

Advertisement field 160 can be used to display a video advertisement thumbnail. In one embodiment, a channel selection canvas generator such as is discussed with respect to FIG. 4 could be used to monitor advertisements on a particular channel for display while an end user was viewing the channel selection canvas. For example, if a user selected ESPN as one of the channels that he wanted to include in his channel selection field, a channel selection canvas generator could store a small set of video advertisements appearing on that channel and then play those ads in advertisement field 160 when channel selection canvas 100 was used. In this way, the ads are more likely to be of interest to the user. Alternatively, further customization could occur such that based on user preferences and header information within an advertisement, ads targeted to a user profile are displayed in advertisement field 160.

Figure 2A:
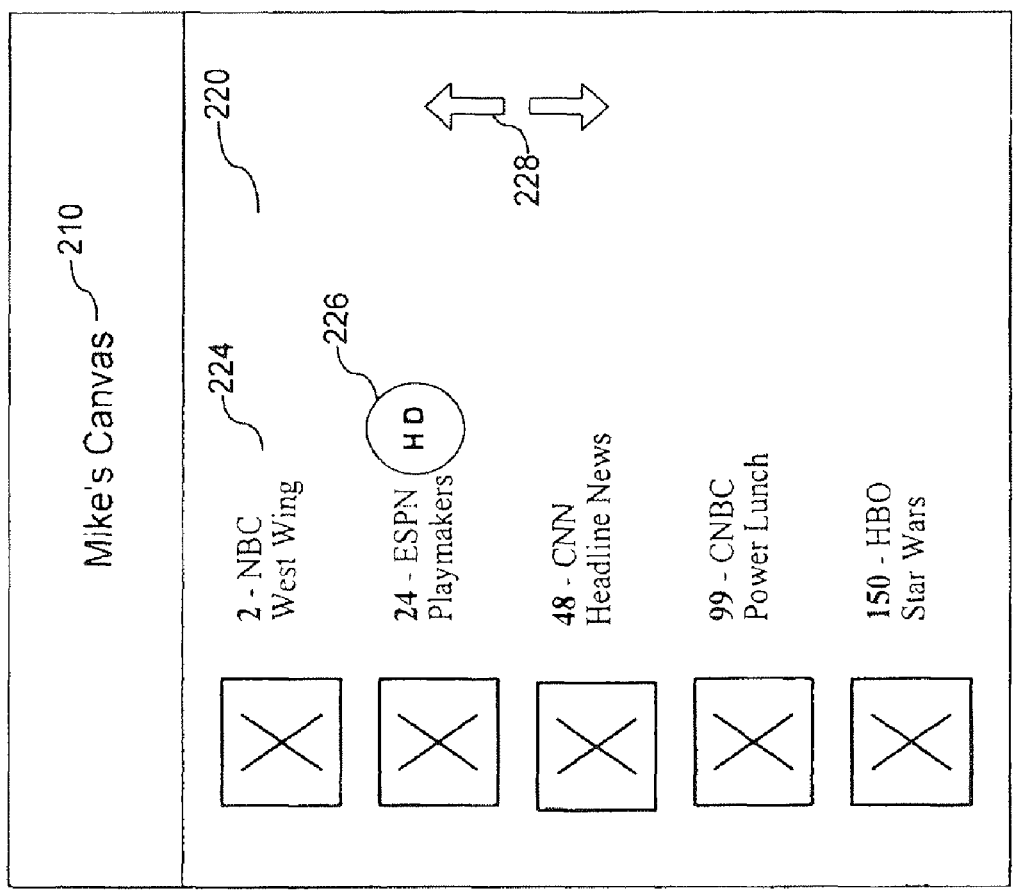
FIG. 2A is a diagram of a channel selection canvas emphasizing the channel selection field, according to an embodiment of the invention.

FIG. 2A is a diagram of channel selection canvas 200 emphasizing the channel selection field, according to an embodiment of the invention. Channel selection canvas 200 represents a simple embodiment of channel selection canvas 100 in that it includes only header field 210 and channel selection field 220. Header field 210 identifies that channel selection canvas 200 has been customized to a user named Mike. In this embodiment, channel selection field 220 has been customized to display five channels of most interest to the user. In other embodiments, the number of display channels could be more or less. For example, an individual may wish to display 10, 15 or even 50 video thumbnails. The upper bound for the number of thumbnails will be a function of the processing power of the video processing device, the size of the display device and the practical consideration of how many thumbnails a user can reasonably view.

The five video thumbnails shown include Channel 2—NBC, West Wing; Channel 24 ESPN, Playmakers; Channel 48—CNN, Headline News; Channel 99—CNBC, Power Lunch; and Channel 150, HBO-Star Wars. Channel selection field 220 also includes icon 226 identifying that the show Playmakers is available in high definition. Also included within channel selection field 220 is scroll bar 228 that can be used to allow a user to scroll through other channels not among his favorite channels for display.

Channel selection canvas 200 can be used in a number of ways. In one example, the user's preferences for channel selection canvas 200 can be stored in either the video display device or in another interconnected device. User preferences can also have a time of day or location component. For example, a user may have three pre-set channel selection canvases, such that if he turns on the television in the morning a channel selection canvas may come up that shows User Mike's favorite morning TV channels—perhaps the NBC, CNN and CNBC. Alternatively if User Mike turns on the television during the mid-day, a channel selection canvas may come up that shows his favorite channels for afternoon soap operas, talk shows or cartoons, such as NBC, CSPAN and Nickelodeon. And, finally channel selection canvas 200 can come up if he turns on the TV in the evening. In one embodiment, channel selection canvas 200 can come up on the television set in which a user intends to view the show.

In another embodiment, a user may be at home and the home includes a wireless network. A user may be working in his study, and wants glimpses what is on television. Channel selection canvas 200 could appear on his personal computer or laptop. In this case, it may be more likely that the video thumbnails are slow motion video or refreshed snapshots. In this case, video selection canvas 200 is being used to preview selections. In another example, a user may have a wireless PDA. The user may request the channel selection canvas on the PDA, and then wirelessly transmit a request from the PDA to a television to turn the television on and display the channel of interest.

Figure 2B:
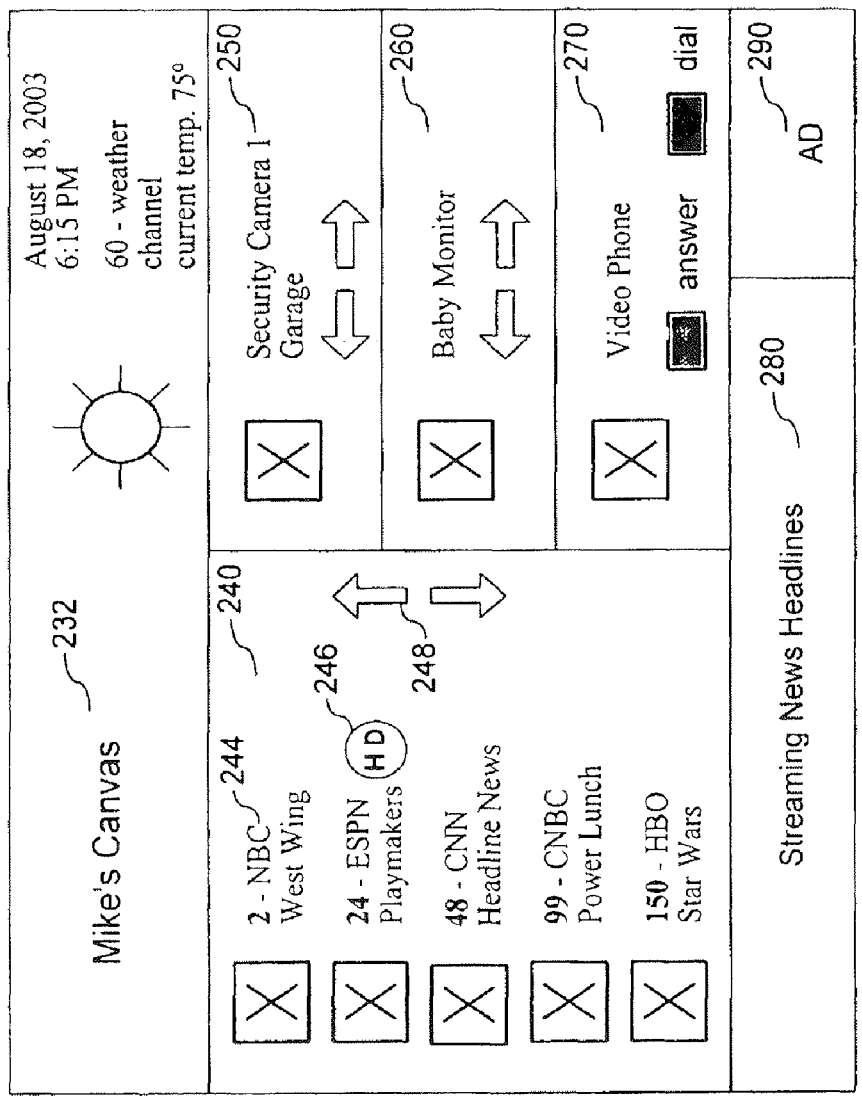
FIG. 2B is a diagram of a channel selection canvas emphasizing the integration of video signals from multiple sources, according to an embodiment of the invention.

FIG. 2B is a diagram of a channel selection canvas 230 emphasizing the integration of video signals from multiple sources, according to an embodiment of the invention. As in the case of channel selection canvas 100, channel selection canvas 230 includes a header field; channel selection field; a set of optional video selection fields; video phone field; news streaming field and advertisement field.

Channel selection canvas 230 includes header field 232, which identifies that the canvas is Mike's Canvas. Header field 232 also provides the date, time, and current weather conditions. Channel selection field 240 includes the same channel selection information described with respect to channel selection field 220 in FIG. 2A. Channel selection canvas 230, however, includes optional video selection fields 250 and 260, and video phone field 270.

Optional video selection field 250 shows an implementation in which security camera thumbnails can be previewed. In this embodiment, the location of the security camera is given, along with a scrolling mechanism for the case when a user may have multiple security cameras. Optional video selection field 260 shows an implementation in which baby monitor thumbnails can be previewed. Finally, in this embodiment a video phone field 270 shows an implementation in which a video phone thumbnail exists, along with the ability to answer or dial a call. By selecting the video phone thumbnail, a user can display another screen that shows a larger size video phone display and additional administrative options for control and management of the video phone. Similarly, if a security camera or baby monitor thumbnail is selected, a user can display a larger display of the baby monitor or security camera along with other options. For example, the baby monitor screen can allow the user to speak to the baby through an audio system, while seeing the baby's reaction. In another embodiment, an optional video field can be used to review what programming is being displayed on other televisions throughout the house.

Figure 3:
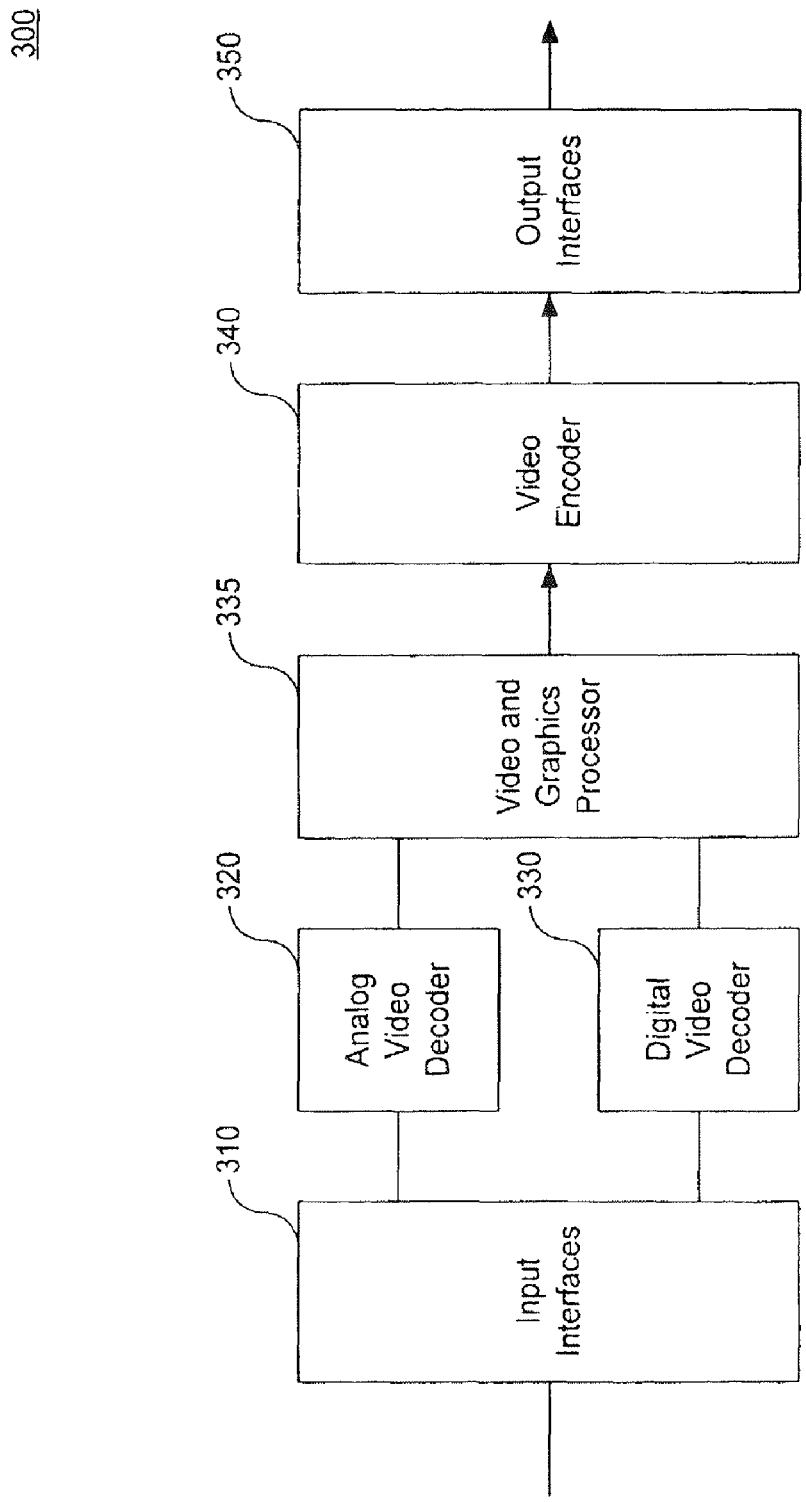
FIG. 3 is a diagram of a video signal processing system.

FIG. 3 is a diagram of a video signal processing system 300. Video signal processing system 300 represents a video signal processing system that could reside in a television, a set top box or other video display device. Video signal processing system 300 provides an example of a video processing system in which a channel selection canvas generator that produces channel selection canvases, such as channel selection canvas 100, can reside.

Video signal processing system 300 includes input interfaces 310, analog video decoder 320, digital video decoder 330, video and graphics processor 335, video encoder 340 and output interfaces 350.

Input interfaces 310 can operate on digital or analog signals using a wide range of protocols. Input interfaces can receive an analog television signal and produce a digital baseband composite video broadcasting signal (CVBS) and a digital audio signal, such as a monaural or Broadcast Television System Committee (BTSC) baseband multiplex signal. The analog input signals can include, among others, National TV System Committee (NTSC), Phase Alternation Line Rate (PAL), and Sequential Couleur Avec Memoire (SECAM) television signals.

Input interfaces 310 can also operate on digital signals, normally in the form of MPEG or DIRECTTV transport streams to perform preprocessing. Input interfaces 310 can also include Ethernet interfaces, among others.

Analog video decoder 320 supports high quality decoding of a standard definition composite video broadcasting signal (CVBS) and S-Video signal. Digital video decoder 330 decodes video signals that comply with the International Telecommunications Union (ITU) standard ITU-R-656 at varying resolutions including 525i, 625i and 240p.

Video and graphics processing module 335 includes a variety of functions for processing video and graphics, and for integrating video and graphics. In particular, video and graphics processing module 335 can optionally include MPEG, graphics and video feeders; video scalers; capture blocks; and/or video compositors for combining video and graphics.

Video encoder 340 encodes processed video signals for output to a display. Video encoder 340 can optionally support both standard and high definition video signals. Video encoder 218 supports a variety of analog video standards (e.g., NTSC, PAL, SECAM, 480i, 480p, 720p, and 1080i), as well as digital video standards (e.g., ITU-R-656 and support for digital video interface (DVI) encoding Output interfaces 350 can include a S-Video composite interface, DVI interface, 656 Interface, RF Mod interface, digital audio port and analog audio port. The S-Video composite interface can output video signals in a variety of formats including SCART1, S-Video, and composite video (CVBS) outputs.

Input interfaces 310 and output interfaces 350 can also include ancillary interfaces such as a V.90 interface, USB 2.0 interface, Ethernet interface and wireless interfaces, such as, for example, the various BLUETOOTH, IEEE 802.11 and IEEE 802.15 ultra-wide band personal area networking standards.

Figure 4:
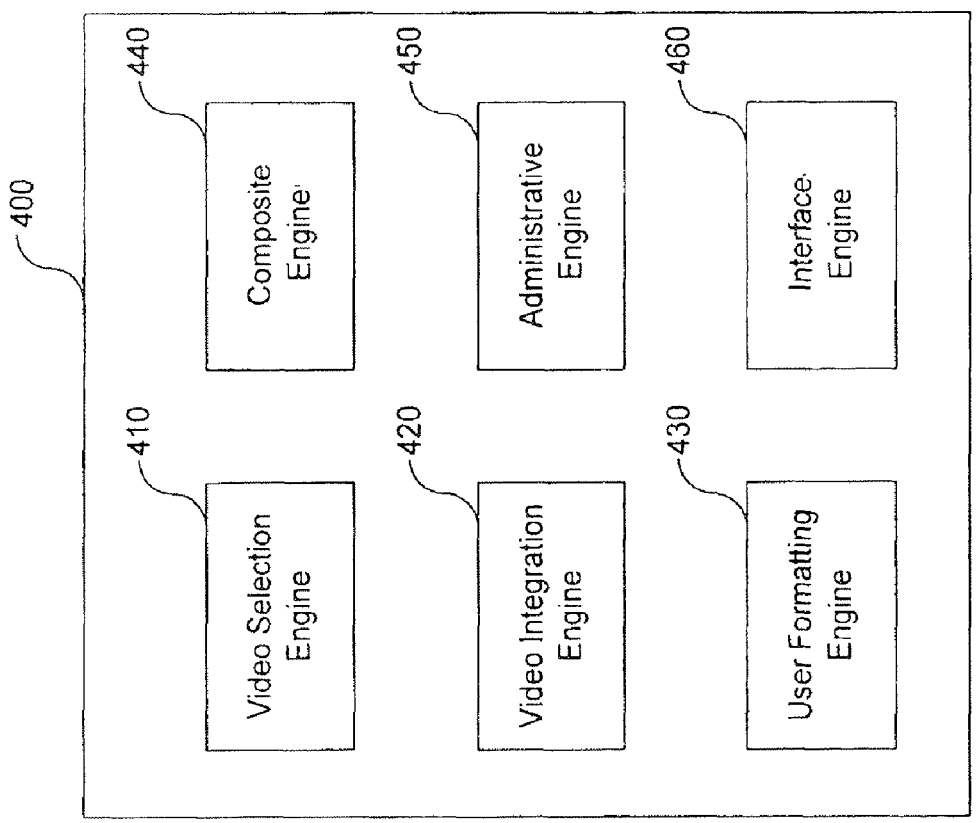
FIG. 4 is a diagram of channel selection canvas generator, according to an embodiment of the invention.

FIG. 4 is a diagram of channel selection canvas generator 400, according to an embodiment of the invention. Channel selection canvas generator 400 generates channel selection canvases, such as channel selection canvas 230. Channel selection canvas generator 400 can be implemented in software, hardware, firmware or any combination of these as will be known by individuals skilled in the relevant arts. Channel selection canvas generator 400 can be located within a video processing system, such as video processing system 300 or coupled to such a system or similar video processing system that can exist within any type of video processing device, such as a television or set top box. In particular, channel selection canvas generator 400 can be located within a television on a chip (TVOC) integrated circuit as is disclosed within co-pending U.S. patent application entitled, "Television Functionality on a Chip," Ser. No. 10/791,686, filed Mar. 3, 2004.

Channel selection canvas generator 400 includes a video selection engine 410, a video integration engine 420, a user formatting engine 430, a composite engine 440, an administrative engine 450 and an interface engine 460.

Video selection engine 410 selects video streams to be displayed on a channel selection canvas. Video integration engine 420 integrates the display of video streams selected by video selection engine 410.

User formatting engine 430 provides instructions and displays screens to gather user formatting information, such that a channel selection canvas can be tailored to a particular user.

Composite engine 440 receives inputs from video integration engine 430 and user formatting engine 430 to create a channel selection canvas. Composite engine 440 determines what sample rate the video display device can support and either optimizes the video thumbnail sample rate or sets a video thumbnail sample rate based on the user preferences. Composite engine 440 provides feedback information to the video selection engine 410 and video integration engine 420 to efficiently capture or sample the desired video signals.

Administrative engine 450 stores user preferences and controls the overall operation of channel selection canvas generator 400.

Interface engine 460 supports an interface to a video display device for displaying a channel selection canvas. Interface engine 460 can also include protocol conversion capabilities to support for transmitting channel selection canvas information and video thumbnails to a remote device, such as laptop computer or PDA. For example, interface engine 460 can include a BLUETOOTH or IEEE 802.11 converter.

Figure 5:
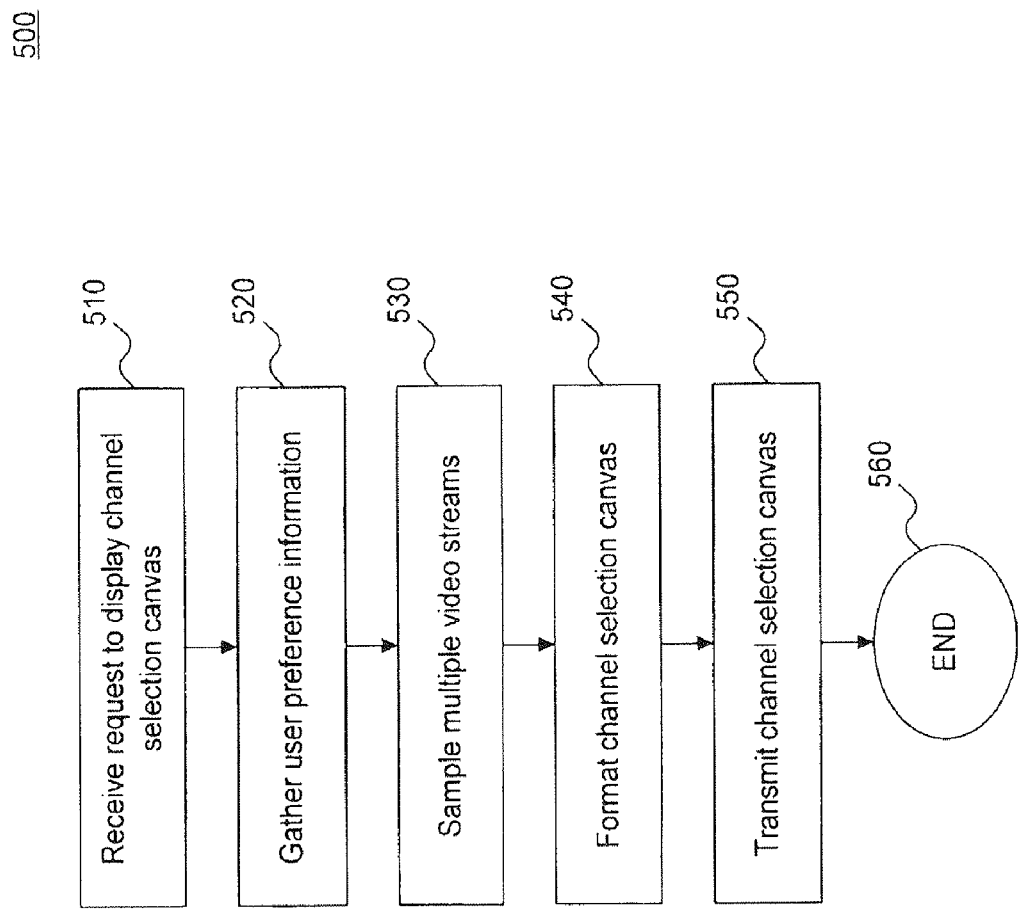
FIG. 5 is a flowchart of a method to provide a channel selection canvas, according to an embodiment of the invention.

FIG. 5 is a flowchart of method 500 that provides a channel selection canvas, according to an embodiment of the invention. Method 500 provides an embodiment illustrating how a channel selection canvas, such as channel selection canvas 200, can be generated and transmitted for display on a video display device.

Method 500 begins in step 510. In step 510, a request to display a channel selection canvas, such as channel selection canvas 100, is received. In one embodiment, a channel selection generator, such as channel selection generator 400, receives a request from a wireless remote device to display a channel selection canvas.

In step 520, user preference information for a channel selection canvas is gathered. In one embodiment, a user formatting engine, such as user formatting engine 430 gathers user preference information. In step 530, based on the user preference information, a video selection engine, such as video selection engine 410 samples multiple video streams. Depending on the user preferences, these video streams can be, but are not limited to, broadcast television, cable television, satellite, security, baby monitor, and/or video phone video streams In step 540, a channel selection canvas, such as channel selection canvas 200 can be formatted based on the user preferences and video streams selected. In step 550, a channel selection canvas is transmitted. In one embodiment, a channel selection generator, such as channel selection generator 400 can reside within the video display device that will display the channel selection generator. In this case, the channel selection canvas is transmitted within the internal circuitry, as will be known by individuals skilled in the relevant arts. In another embodiment, a channel selection generator can use an interface engine, such as interface engine 460 to wirelessly transmit the channel selection canvas to a remote device. In another embodiment, a channel selection generator can use an interface engine, such as interface engine 460 to transmit the channel selection canvas using an Ethernet connection or similar wireline communication protocol to a remote device. In step 560, method 500 ends.

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A channel selection canvas generator for generating a channel selection canvas for display on a video display device, comprising:
   a video selection engine configured to select video streams to be displayed on the channel selection canvas as thumbnails;
   a video integration engine configured to integrate the display of video streams selected by the video selection engine; and
   a composite engine configured to receive inputs from the video integration engine to create the channel selection canvas and to format a speed at which the video streams are displayed by the thumbnails based on capabilities of the channel selection canvas generator, capabilities of the video display device, and a desired video quality.

2. The channel selection canvas generator of claim 1, wherein the composite engine further formats the thumbnails based on a processing capability of the video display device.

3. The channel selection canvas generator of claim 1, further comprising an interface engine configured to support an interface to the video display device for displaying the channel selection canvas.

4. The channel selection canvas generator of claim 3, wherein the interface engine is configured to wirelessly transmit the channel selection canvas to the video display device.

5. The channel selection canvas generator of claim 4, wherein the interface engine includes at least one of a BLUETOOTH wireless interface, an IEEE 802.11 wireless interface, and an IEEE 802.15 wireless interface.

6. The channel selection canvas generator of claim 1, wherein the speed at which the video streams are displayed is at least one of full motion video, slow motion video, and snapshots.

7. The channel selection canvas generator of claim 1, further comprising a user formatting engine configured to obtain user preference information for formatting the channel selection canvas.

8. The channel selection canvas generator of claim 7, wherein the user preference information includes a number of thumbnails that are to be included in the channel selection canvas for previewing the selected video streams.

9. The channel selection canvas generator of claim 7, wherein the user preference information includes at least one of a location, size, and orientation of fields in the channel selection canvas.

10. The channel selection canvas generator of claim 7, wherein the composite engine is configured to format the channel selection canvas based on the user preference information obtained by the user formatting engine.

11. The channel selection canvas generator of claim 1, wherein the channel selection canvas includes an advertisement field for displaying an advertisement, wherein the video selection engine is configured to select the advertisement based on one or more of the video streams to be displayed on the channel selection canvas as thumbnails.

12. The channel selection canvas generator of claim 1, wherein the channel selection canvas includes an advertisement field for displaying an advertisement, wherein the video selection engine is configured to select the advertisement based on one or more advertisements appearing on the video streams to be displayed on the channel selection canvas as thumbnails.

13. A method for generating a channel selection canvas for display on a video display device, comprising:

selecting video streams to be displayed on the channel selection canvas as thumbnails;

integrating the display of the selected video streams to create the channel selection canvas; and formatting a speed at which the video streams are displayed by the thumbnails based on capabilities of a channel selection canvas generator used to generate the channel selection canvas, capabilities of the video display device, and a desired video quality.

14. The method of claim 13, further comprising:

formatting the thumbnails based on a processing capability of the video display device.

15. The method of claim 13, further comprising:

wirelessly transmitting the channel selection canvas to the video display device.

16. The method of claim 13, wherein the speed at which the video streams are displayed is at least one of full motion video, slow motion video, and snapshots.

17. The method of claim 13, further comprising:

obtaining user preference information for formatting the channel selection canvas.

18. The method of claim 17, wherein the user preference information includes a number of thumbnails that are to be included in the channel selection canvas for previewing the selected video streams.

19. The method of claim 17, wherein the user preference information includes at least one of a location, size, and orientation of fields in the channel selection canvas.

20. The method of claim 13, wherein the channel selection canvas includes an advertisement field for displaying an advertisement, wherein the advertisement is selected based on the video streams to be displayed on the channel selection canvas as thumbnails.

21. The method of claim 13, wherein the channel selection canvas includes an advertisement field for displaying an advertisement, wherein the advertisement is selected based on advertisements appearing on one of the video streams.

\* \* \* \* \*